Figure 1:
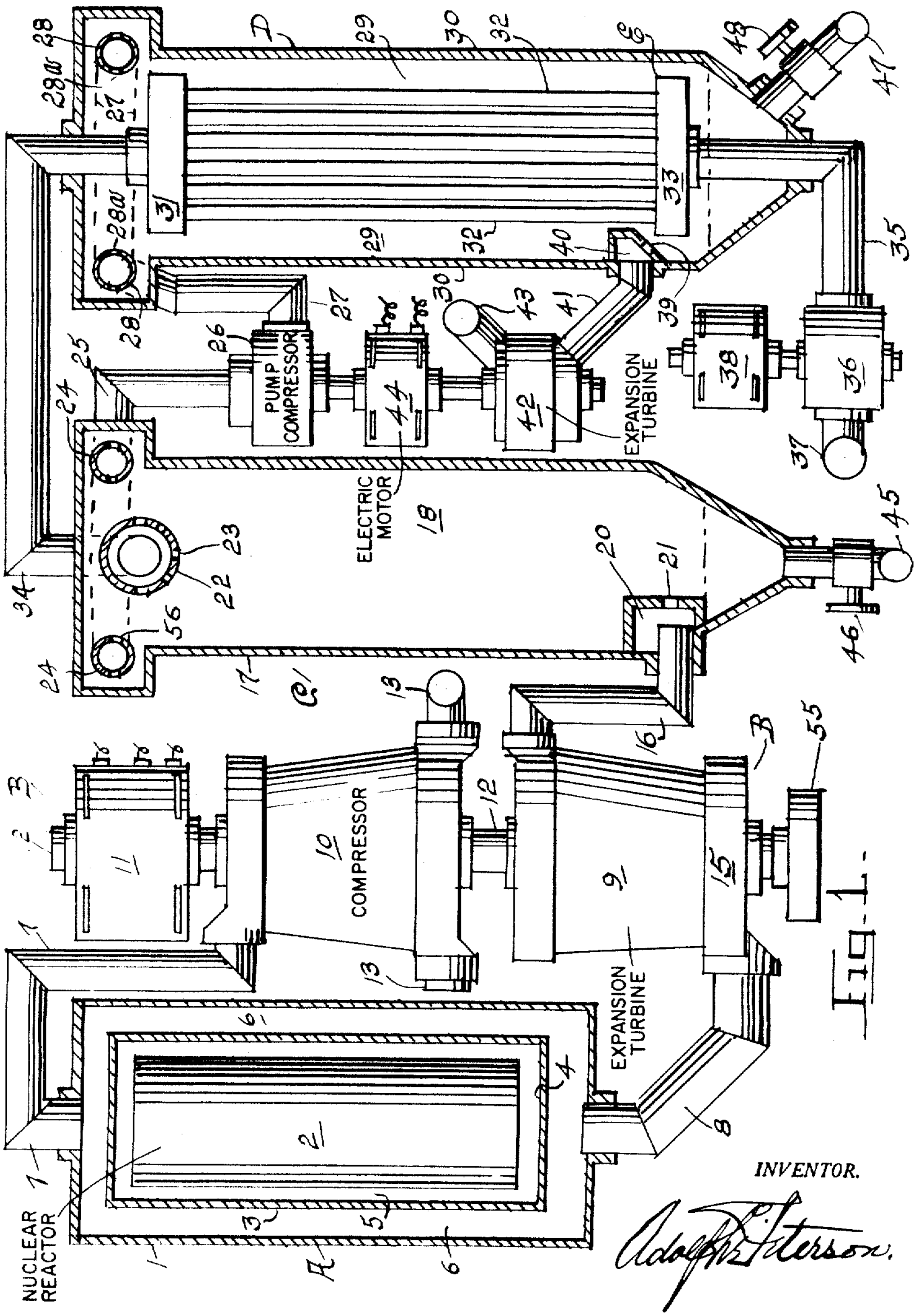

INVENTOR.

Adolph P. Peterson

INVENTOR.
Adolph C. Peterson

United States Patent Office 3,336,207
Patented Aug. 15, 1967

3,336,207

UTILIZATION OF NUCLEAR REACTOR IN CONNECTIVE DISTILLATION AND POWER GENERATION SYSTEM

Adolphe C. Peterson, 4623 Bruce Ave. S., Minneapolis, Minn. 55431

Filed Dec. 31, 1962, Ser. No. 248,342
14 Claims. (Cl. 202—236)

My invention relates to power generation means and means for recovery of materials from materials solution and it is accordingly called power generation and recovery system.

One primary object of my invention is to provide a means which shall be enabled, because of its component elements and units and the manner of their use, to separate the much desired fresh water or salt-free water from the very abundant sea-water of the ocean, where the water is of such character that it is not available either for human beings or animals or crops or vegetables in growing, for their continued sustentation and development. The water of the ocean is in general available in locations relatively near to those lands of the earth which are generally arid or dry or desert in character as all of such types of lands are generally or very near, or relatively near the equator, such as lands in the southern or western portions or southwestern portions of the United States, and such as are near the Mediterranean Sea. Such lands generally could be very fertile, if water was available in sufficient quantity as salt-free water. Likewise the water of the ocean is sometimes very near the large cities of the United States and other countries, which cities must procure fresh water from distant locations by means of canals or conduits which are constructed at very high cost and are therefore almost prohibitive in construction cost. It is a chief object especially to provide such means for procurement of salt-free water from such ocean water by a means which in cost shall be within the means and ability of regions and cities which might be served by such a means. An object is the provision of means for the purpose stated which means shall utilize a relatively simple means for the accomplishment of the objective, and which means shall utilize a system which inherently provides a large portion if not all, as in some cases, of the heat and power requirements for the operation, and which shall therefore be a comparatively low cost or costless system for such provision, insofar as operation or maintenance cost is concerned.

Another chief object is the provision of a system such as has been generally outlined in the above, which system, in connection with power generation means especially in electric generating means in use of communities shall provide use of part of the heat generated in the power and heat cycle of the generation means in the materials recovery system and objective, so that thus the provision of the necessary heat for economical use of the recovery system shall be not only without high initial cost of apparatus for such purpose but also shall be without high continuing cost for the provision of the heat utilized in the recovery system. And an especial object is the provision for use in such a system and as a part thereof of a form of nuclear reactor unit or means, both for the purpose of the power generation and for the purpose of the heat provision for the materials recovery in the system. An object is the provision of such a system for use with any form of such reactor means whether of the atomic fission or of the atomic fusion form, or any thermo-nuclear system.

It is an object to provide such a system or plant which is so designed that initial construction or capital costs are substantially lower than as otherwise might be the cost involved. It is further an object especially to provide such a means of accomplishment of the objectives as will involve less material of costly nature in its construction and which will also involve less labour in the construction of a plant for the purpose stated. While it is contemplated that the chief use of the system and devices will be for the generation of power coupled with the release of recovery of salt-free water from sea-water, it is intended that the apparatus and system is adaptable to similar use for similar purposes with other materials than sea-water, such as sewage of cities or communities, and such as the water effluent from manufacturing or chemicals producing plants. A further object is the provision of such a plant as will easily and with less cost provide the basis for provision of materials for extraction of such materials as magnesium and other metals and elements from sea-water, in connection with the provision of salt-free water and the provision of power generation and especially of electricity generation for use of communities and plants utilizing electricity or power.

Figure 2:
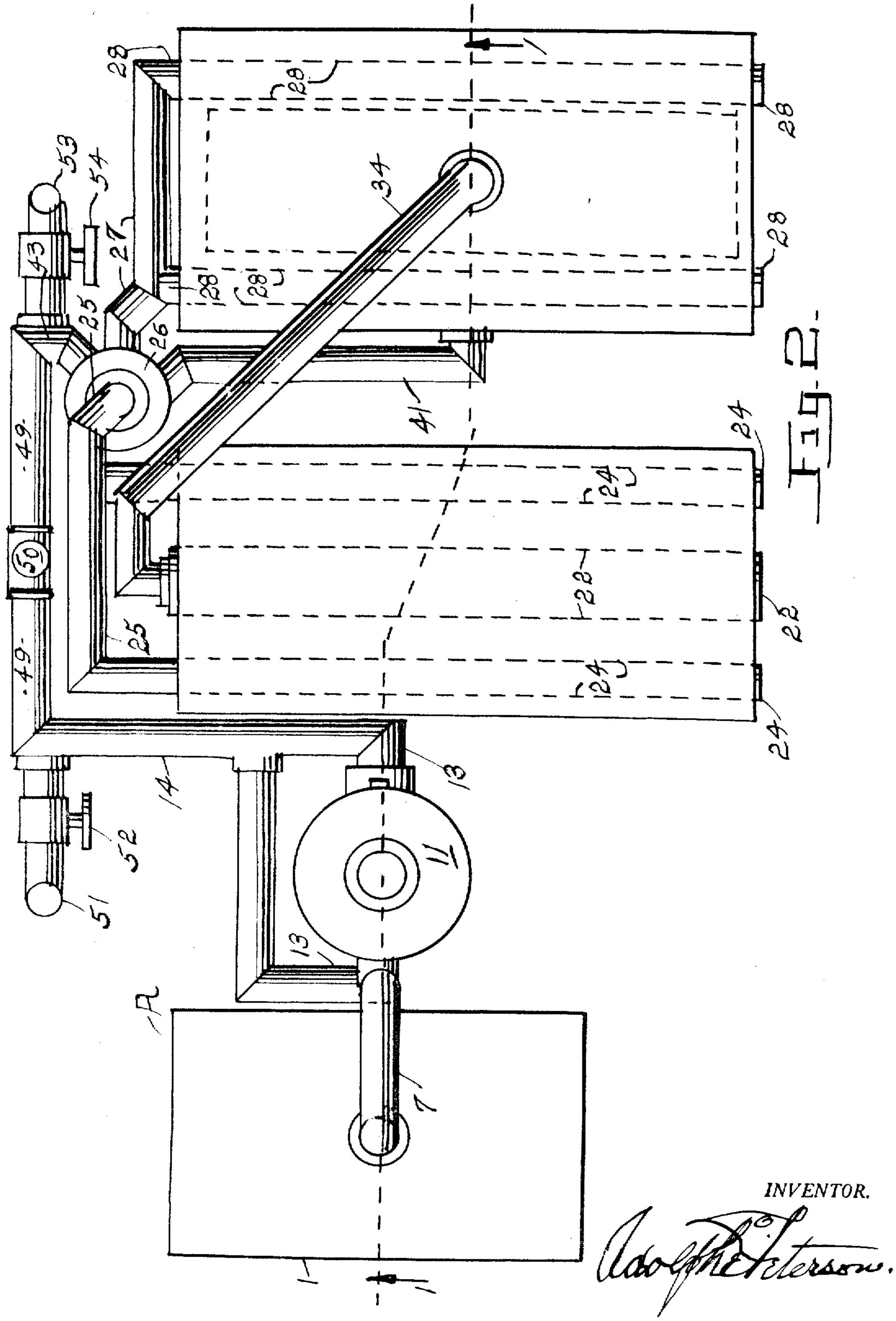

The principal devices and combinations of devices comprising my invention are as hereinafter described and as further defined in the claims. In the accompanying drawings which illustrate my invention like characters refer to like parts insofar as is feasible. Referring to the drawings:

FIGURE 1 is a view chiefly in vertical cross section transversely of some of the units and elements of the device and is on the line 1—1 of FIGURE 2, some parts or units being shown in full side elevation, some parts being broken away, some units and parts being shown in diagrammatic character only.

FIGURE 2 is a plan view which is necessarily largely diagrammatic in character because of the considerable number of devices included and because of the extensive character of units included, this view being on a scale which is somewhat less than the scale of FIGURE 1, this view showing connections of units as may be shown in plan view, such connections being somewhat differently arranged in order that there may be a clear representation of the elements of the device and their relation one to others, although the functions and use are similar; a plural number of some units being included; if found to be necessary in any particular construction.

The apparatus for the purpose described embodies chief or principal units which are generally designated as: A nuclear reactor heat generation means A; a power generation means B; an evaporator unit C; a condenser means D. In addition there are other elements or devices which will be hereinafter described which elements or devices are necessary in order that the device may function in the contemplated manner for the purposes described.

Referring first to the means designated as A, this means includes an outer shell or casing 1 which has therewithin a nuclear reactor unit 2 this unit being any known or contemplated form of nuclear reactor means for heat generation such heat generation being possible and accomplishable by either atomic fission or fusion. It is contemplated that the illustration is merely a general designation of such a nuclear reactor and that this designation thereof is intended to include any and all elements and devices which are necessary for the accomplishment of heat generation. There is another shell or casing 3 which is an intermediate casing which substantially surrounds the nuclear reactor unit 2 but with a space between which space designated 4 will, in such apparatus where necessary, be filled with a radiation insulation 5 which will to some extent prohibit or restrict harmful radiation from the nuclear reactor unit to the gaseous fluid space 6 which substantially surrounds the casing 3. The association of these spaces and elements is such that heat generated by the nuclear reactor unit 2 will be transmitted through the casing 3 and the radiation insulation 5 to the space 6 for absorption by gaseous fluid which as hereinafter described is caused to flow through the gaseous fluid space 6. In such constructions employing nuclear reactor unit means, which may not have an excessive degree of radiation emanating therefrom, the casing 3 and the radiation insulation 5 may be eliminated and the space 6 and gaseous fluid passing therethrough flowing therethrough may absorb the generated heat directly from the nuclear reactor unit 2.

The space 6 is in connection as is hereinafter specifically defined with other means by means of an induction conduit 7 for reception of gaseous fluid and is in connection with a discharge conduit 8 for discharge of gaseous fluid as heated. The power generation means B includes a gaseous fluid turbine 9, a gaseous fluid compressor 10, an electric generator 11, and main shaft 12. The compressor and the turbine are constructed as and embody such devices and elements as are generally included in such means, namely the rotors, rotor blades turbine and compressor, such stator blades as are necessary. The turbine 9 does not include combustion and fuel injection means as the necessary heat will be supplied to the gaseous fluid by the nuclear reactor unit 2. The turbine will operate as well known air turbines operate to produce kinetic energy in the main shaft 12 to thereby drive the compressor and the electric generator 11. The compressor will induct gaseous fluid thereto for compression by means of the two branch conduits 13 which unite with the one conduit 14, and the compressor 10 will discharge gaseous fluid after compression to a pressure which may be say fifty or more pounds per square inch, even as much as one hundred pounds per square inch or more this being as determined to be advisable for any projected construction, and the discharge under compression will be to the induction conduit 7 and thereby to the space 6.

The space 6 will discharge heated gaseous fluid, after absorption of heat from the nuclear reactor 2, to the discharge conduit 8 and thereby to the pressure chamber 15 of the turbine 9 and the gaseous fluid will flow through the turbine 9 to the turbine discharge conduit 16, the flow of the gaseous fluid through the turbine 9 creating kinetic energy in the main shaft 12 in the well known manner of turbine rotor propulsion by the means of flowing gaseous fluid.

The evaporator unit C is formed by a casing 17 wherein there is formed a chamber 18 which is relatively high in dimension and long in one horizontal dimension as compared with the transverse section as shown in FIGURE 1. The chamber 18 is the evaporative chamber and receives the gaseous fluid discharged from the turbine 9 by means of its discharge conduit 16 the latter connecting the turbine discharge with the evaporative chamber 18, the gaseous fluid entering the evaporative chamber 18 by means of the conduit 16 and the horizontally extended dispersion conduit 20 by which the fluid is conducted to a large number of apertures 21 by which the gaseous fluid is dispersed throughout the length of the lower part of the evaporative chamber 18, so that thereby the fluid is well distributed, when it enters the chamber 18, throughout the extended lower part thereof.

The evaporative chamber 18 at its upper part has therein a horizontally extended solution conduit 22 which receives solution for segregation and discharges the solution in the form of a relatively fine spray by means of a large number of apertures or nozzles 23. These apertures or nozzles 23 may be of any type such as will adequately and best distribute the solution as a fine spray of minute particles of the solution and in the manner best suited for the accomplishment of the evaporative action hereinafter described. The evaporative chamber 18 at its upper part has also two horizontally extended vapor collection conduits for collection of the gaseous fluid with absorbed evaporated liquid from the solution designated. These conduits designated 24 may otherwise be designated as gas and vapor conduits or collection means. At one end these conduits 24 are closed. At the other end the conduits 24 are united to form the conduit 25 by which the gas and vapor are delivered to a pump-compressor 26 preferably of the centrifugal type, and the pump-compressor 26 delivers the gas-vapor by conduit 27 to the two distribution conduits 28 each of which is extended horizontally in the upper end of the condenser chamber 29 which latter is formed within the condenser casing 30, this being high in vertical dimension, long in one horizontal direction and relatively narrow in the other horizontal direction.

The condenser chamber 29 has placed within it a heat transfer unit E which has upper header 31, transfer pipes 32, lower header 33. The upper header 31 is connected by the conduit 34 with the solution conduit 22 so that solution may flow from the upper header 31 to be sprayed into and widely disseminated in the upper end of the evaporative chamber 18. The lower header 33 receives solution for segregation by means of conduit 35 and the latter in turn receives solution as pumped thereto by pump 36 from a supply pipe 37, the pump 36 being driven by electric motor 38, the latter being controlled by any control means which may be provided therefor.

The condenser chamber 29 discharges gaseous fluid remaining after vapor condensation, by means of apertures 39 to horizontally extended conduit 40 and thereby to pipe 41 and to an air turbine or gaseous fluid turbine 42 which discharges by pipe 43 and as hereinafter described. The turbine 42 assists in driving the pump-compressor 26, the electric motor 44 providing some additional driving power as may be needed. The means formed by this turbine 42 and the pump-compressor 26 is intermediately of the flow of gaseous fluid and vapor from chamber 18 to the condenser chamber, but this means may not necessarily be included as in some constructions it may be considered unnecessary or better eliminated. In any case the flow of fluid and vapor from chamber 18 to the condenser chamber is unimpeded whether or not the pump-compressor 26 is operated as such. It is not intended that there be any considerable compression of the gaseous fluid and vapor but rather that there be enough suction upon the gaseous fluid in chamber 18 so that evaporation is thereby aided and not diminished by pressure. Any heat by the pump-compressor 26 is only slight or small in relation to other heat supplied and there may be enough flow of solution in the heat transfer means to compensate for this additional heat if any supplied by pump-compressor 26.

The lower parts of each chamber 18 and 29 is formed as a trough, the chamber 18 having brine ejection by pipe 45, as controlled by hand valve 46 (or other means), the chamber 29 having condensed segregated liquid ejection by means of pipe 47 as controlled by hand valve 48 (or other means).

There may be supply of gaseous fluid as atmospheric air or any such gaseous fluid as nitrogen or carbon dioxide or other inert gaseous fluid, the gaseous fluid flow being as determined by the following described means. There is between the conduits 14 and 43 a connecting conduit 49 and interposed therein is the hand valve 50, and by this hand valve the connection through the connecting conduit 49 and between the conduits 14 and 43 may be interrupted or open for the alternative flow systems which is provided for. The pipe 14 may have connection by the conduit 51 to atmosphere but this connection for induction of atmospheric air may be interrupted by the hand valve 52 or opened. The pipe 43 may have connection by the conduit 53 with the atmospheric ambient air but this connection may be broken by the hand valve 54 or may be permitted. When the hand valve 50 is placed to close the connection 49, the hand valves 52 and 54 will be opened and in this condition there will not be recirculation of atmospheric air as a closed circuit, but there will be induction of ambient atmospheric air to the gaseous fluid compressor 10 and inducted ambient air will then flow in the gaseous fluid system. When the hand valve 50 is placed to open the connection 49, the hand valves 52 and 54 will be closed and in this condition there will be a closed circuit and there may be circulation of any gaseous fluid such as contained atmospheric air or contained nitrogen or carbon dioxide. It should be noted that the evaporation chamber 18 is a closed chamber except for the induction and discharge means which is described herein, and that the condenser chamber 29 is a closed chamber except for the induction and discharge means which is described herein.

Having in the foregoing specifically described the elements and devices comprising the system for power generation and materials segregation, the general operation is described. It is contemplated that the nuclear reactor will have its fuel elements installed as is necessary in such reactors. It is assumed first that the condition for induction of ambient air is obtained by closing of the hand valve 50 and opening of the hand valves 52 and 54, and that means for supply of electric current to the electric motors mentioned is procured and means for control of such motors as may be necessary is installed and properly controlled in such manner as such motors are commonly controlled. The apparatus having been placed in the operating condition, an electric starting motor 55 effective to initially drive the main shaft 12 is supplied with electric current for starting of the shaft 12 and the compressor and turbine rotors.

In the operating condition, the gaseous fluid compressor 10 will induct atmospheric ambient air by means of the conduits 51 and 14 and this air will be compressed in the compressor 10 to say at least fifty pounds per square inch and preferably to as much as one hundred pounds or such pressure as may be effectively obtained in the designed construction. The air as compressed flows to the space 6 and is heated in that space and flows by the conduit 8 to the gaseous fluid turbine 9 at the latter's induction chamber 15 and passing through the turbine and therein driving the turbine rotor, as in turbines, the heated air by expansion and impact converts the absorbed heat energy to kinetic energy thus driving the electric generator 11 which it is assumed will then supply electric energy to main lines for electric distribution and use, as in any public electricity distribution means, or as otherwise may be intended for use. After such expansion and work energy production, the air flowing from the turbine 9 will have a considerable percentage retained of the absorbed heat, and this remaining heat will pass with the turbine exhaust by way of the conduit 16 to the evaporation chamber 18 being distributed in the lower part thereof.

In the operating condition the electric motor 38 drives the solution pump 36 and thus solution for segregation, which may be sea-water or other solution according to the planned use, will flow under comparatively low pressure by conduit 35 to the header 33 and thereby to heat transfer pipes 32 and to the upper header 31 and by conduit 34 to the conduit 22 and the spraying apertures or nozzles 23, and as thus sprayed the solution will be disseminated in the upper part of the chamber 18 and will as a relatively fine spray flow downwardly through the length and breadth of the chamber 18. In such descent in chamber 18, the solution particles will be enveloped in the upwardly passing gaseous fluid (air) from the turbine 9, and the heat will cause evaporation of liquid contained in the solution spray. The evaporated vapor will continue its passage upwardly to the collection conduits 24 and pass thereby and by pipe 25 to the pump-compressor 26 and by conduit 27 to the horizontally extended conduits 28 in chamber 29 and this fluid mixture of air and vapor will enter chamber 29 and pass in widely scattered flow downwardly through chamber 29 passing the heat transfer pipes 32 on the way downwardly and thus heat in the vapor will be absorbed and the major part of the contained liquid will be condensed to form drops of liquid which will descend to the trough in the lower part of chamber 29. The condensed liquid will collect in that trough and may periodically or continuously be withdrawn therefrom by the conduit 47 the hand valve 48 being then for such withdrawal opened. It should be noted that such a quantity of condensed liquid as will prevent air flow by conduit 47 should be maintained. Such leveling of liquid may be controlled in any manner, control means for such purposes being well known.

The gaseous fluid air remaining in the lower part of chamber 29 will pass by conduit 41 to air turbine 42 driving it and thus assisting in driving the pump-compressor 26. The motor 44 supplies such additional driving power to the pump-compressor 26 as is necessary according to the contemplated operation. In some conditions of use the pump-compressor 26 may be inactive and the motor 44 not be operative. In such inoperative condition of the pump-compressor 26 the gaseous fluid will merely pass through the means 26 as a passage-way for the gaseous fluid. In some circumstances it may improve the operating efficiency to utilize the pump-compressor 26 by driving thereof in order that there may be some suction of the chamber 18 and thus greater evaporative functioning of the chamber 18, for the forming of vapor. In the operation with continued induction of ambient air for use in the system, the air will be discharged to atmosphere by the conduit 53, the hand valve 54 then being open. Conduits 24 receive fluid by apertures 56.

In some uses it may be advisable to operate the device with the gaseous fluid in a closed circuit. In that case the hand valve 50 will be open and the hand valves 52 and 54 will be closed, after first injecting into the system such an amount of the gaseous fluid to be used. Such fluid may be air, or nitrogen, or carbon dioxide, or any suitable gaseous and substantially inert gas. The operation, with the closed circuit, will then be substantially similar, the only difference being, that the gaseous fluid is continuously circulated in the system, and without induction of ambient air.

The trough at the base of chamber 18 will collect concentrated brine which may descend thereto and this may be continuously or periodically withdrawn by the conduit 45 by opening of the hand valve 46, there being always however a sufficient quantity of the brine maintained in the bottom of the trough to prevent air passage, if the hand valve be opened. Any other means for removal of deposited material from the solution after evaporation may be utilized instead. In some circumstances it may be advisable to add some quantity of heat by the compression by pump-compressor 26. While I have shown particular devices and combinations of devices in the illustration of my invention, I intend and contemplate that other detailed devices and combinations of devices may be utilized in the realization of my invention without departing from the scope and spirit thereof.

What I claim is:

1. In means of the character described: two chambers one of which is a low pressure evaporation chamber, one of which is a condensation chamber having heat transfer means in heat transfer relation with vapor bearing fluid in said condensation chamber; a power producing plant including, a nuclear reactor means for heat generation, a gaseous fluid passage means in heat transfer association with said nuclear reactor means, an engine utilizing gaseous fluid flow for kinetic energy production; means for flow of gaseous fluid through said gaseous fluid passage means and from said gaseous fluid passage means to said engine for driving thereof and from said engine to said evaporation chamber for flow therethrough in heat transfer relation with solution for segregation, and from said evaporation chamber to said condensation chamber; a discharge for gaseous fluid from said condensation chamber; means for flow of solution for segregation through said heat transfer means for absorption of heat from vapor bearing fluid in said condensation chamber; means for flow of solution for segregation from said heat transfer means to said evaporation chamber.

2. The means as defined in claim 1 and: the said engine producing kinetic energy having driving connection with electric generating means for electric power production and delivery of electric current to main electric current supplying lines.

3. The means as defined in claim 1 and: means intermediately of said nuclear reactor means and said gaseous fluid passage means for transmission of heat from said nuclear reactor means to gaseous fluid flowing in said gaseous fluid passage means.

4. The means as defined in claim 1 and: means intermediately of said nuclear reactor means and said gaseous fluid flow passage means for transmission of heat from said nuclear reactor means to gaseous fluid flowing in said flow passage means, said last named means being of a character providing resistance to radiation transmission to said gaseous fluid.

5. In apparatus for power production and materials segregation: air induction and compression means from which compressed air flows to nuclear reactor heat generation means in heat transfer association for heat absorption therefrom; means utilizing the pressure and heat of the heated pressurized air in an engine utilizing such air for kinetic energy production; an evaporation chamber to which and through which said air after heat utilization in said engine exhaust flows to said evaporation chamber for dissemination therein; means for flow of solution for segregation to said evaporation chamber for dissemination in the said exhausted air flowing thereinto; means for flow of the exhausted air bearing evaporated liquid from said evaporation chamber into a condensation chamber; means for flow of a cooling fluid through heat transfer means in heat transfer relation with the air and vapor fluid flowing to said condensation chamber from said evaporation chamber; means for discharge of said exhaust air from said condensation chamber relieved of at least a portion of the evaporated liquid carried thereby.

6. The means as defined in claim 5 and: means whereby said engine drives electric generating means for electric power production and delivery of electric current to main electric supplying lines.

7. The means as defined in claim 5 and: the means for flow of solution for segregation to said evaporation chamber including means in the vertically upward portion of said evaporation chamber to spray said solution in finely divided form into said exhaust air flowing in and through said evaporation chamber.

8. The means as defined in claim 5 and: means for removal of concentrated unevaporated materials from said evaporation chamber.

9. In apparatus for power production and materials segregation: gaseous fluid induction and compression means from which gaseous fluid flows to nuclear reactor heat generating means in heat transfer association for heat adsorption therefrom; means utilizing the pressure and heat of the heated pressurized gaseous fluid in an engine utilizing such gaseous fluid for kinetic energy production; an evaporation chamber to which and through which exhausted gaseous fluid from said engine after kinetic energy motivation flows for dissemination in said evaporation chamber; means for flow of solution for segregation to said evaporation chamber for dissemination in the said exhausted gaseous fluid flowing thereinto; means for flow of the exhausted gaseous fluid bearing evaporated liquid into a condensation chamber; means for flow of a cooling fluid through heat transfer means in heat transfer relation with the gaseous fluid and vapor borne thereby and flowing to said condensation chamber from said evaporation chamber; means for discharge of said gaseous fluid from said condensation chamber relieved of at least a portion of the evaporated liquid carried thereby from said evaporation chamber.

10. The means as defined in claim 9 and: the means for flow of a cooling fluid through said heat transfer means providing for supply of solution for segregation to flow through said heat transfer means and providing for flow of the solution for segregation from said heat transfer means and to said means for dissemination in said evaporation chamber.

11. The means as defined in claim 9 and: the said discharge for gaseous fluid having connection with said means for induction and compression to so provide the said gaseous fluid.

12. In apparatus for power production and materials segregation: gaseous fluid induction and compression means from which gaseous fluid flows to nuclear reactor heat generating means in heat transfer association for heat adsorption therefrom; means utilizing the pressure and heat of the heated pressurized gaseous fluid in an engine utilizing such gaseous fluid for kinetic energy production; and evaporation chamber to which and through which exhausted gaseous fluid from said engine, flows for dissemination in said evaporation chamber; means for flow of solution for segregation to said evaporation chamber for dissemination in the said gaseous fluid flowing thereinto; means for flow of the exhausted gaseous fluid bearing evaporated liquid into a condensation chamber; means for flow of a cooling fluid through heat transfer means in heat transfer relation with the gaseous fluid and vapor borne thereby and flowing to said condensation chamber from said evaporation chamber; means for discharge of said gaseous fluid from said condensation chamber relieved of at least a portion of the evaporated liquid carried thereby from said evaporation chamber; the means for flow of the exhausted gaseous fluid and vapor into the condensation chamber including a pressure modulating mean intermediately of said chambers to reduce pressure in said evaporation chamber and increase pressure on gaseous fluid flowing to said condensation chamber, and means driving said modulating means; the last named driving means being fluid driven motor means receiving gaseous fluid as discharged from said condensation chamber and being driven thereby.

13. In apparatus for power production and materials segregation; gaseous fluid induction and compression means from which gaseous fluid flows to nuclear reactor heat generating means in heat transfer association for heat absorption therefrom; means utilizing the pressure and heat of the heated pressurized gaseous fluid in an engine utilizing such gaseous fluid for kinetic energy production; and an evaporation chamber to which and through which exhausted gaseous fluid from said engine, flows for dissemination in said evaporation chamber; means for flow of solution for segregation to said evaporation chamber for dissemination in the said gaseous fluid flowing thereinto; means for flow of the exhausted gaseous fluid bearing evaporated liquid into a condensation chamber; means for flow of cooling fluid through heat transfer means in heat transfer relation with the gaseous fluid and vapor borne thereby and flowing to said condensation chamber from said evaporation chamber; means for discharge of said gaseous fluid from said condensation chamber relieved of at least a portion of the evaporated liquid carried thereby from said evaporation chamber; the means for flow of the exhausted gaseous fluid and vapor from the evaporation chamber and to the condensation chamber including a pump-compressor means between said chambers withdrawing and compressing the gaseous fluid and vapor from the evaporation chamber; and including gaseous fluid driven turbine means driving the pump-compressor means and having connection with the discharge of gaseous fluid from the condensation chamber for passage of the pressurized fluid, received from the evaporation chamber, by way of the pump-compressor means and condensation chamber; and other means imparting driving energy to assist in driving the pump-compressor means.

14. In apparatus for power production and materials segregation: gaseous fluid induction and compression means from which gaseous fluid flows in proximity to heat exuding means in heat transfer association for heat absorption therefrom: means utilizing the pressure and heat of the heated pressurized gaseous fluid in an engine utilizing such gaseous fluid for kinetic energy production; and an evaporation chamber to which and through which exhausted gaseous fluid from said engine, flows for dissemination in said evaporation chamber; means for flow of solution for segregation to said evaporation chamber for dissemination in the said gaseous fluid flowing thereinto; means for flow of the exhausted gaseous fluid bearing evaporated liquid into a condensation chamber; means for flow of cooling fluid through heat transfer means in heat transfer relation with the gaseous fluid and vapor borne thereby and flowing to said condensation chamber from said evaporation chamber; means for discharge of said gaseous fluid from said condensation chamber relieved of at least a portion of the evaporated liquid carried thereby from said evaporation chamber; the means for flow of the exhausted gaseous fluid and vapor from the evaporation chamber and to the condensation chamber including a pump-compressor means between said chambers withdrawing and compressing the gaseous fluid and vapor from the evaporation chamber; and including gaseous fluid driven turbine means driving the pump-compressor means and having connection with the discharge of gaseous fluid from the condensation chamber for passage of the pressurized fluid, received from the evaporation chamber, by way of the pump-compressor means and condensation chamber; and other means imparting driving energy to assist in driving the pump-compressor means.

References Cited

UNITED STATES PATENTS

| | | | |
|---|---|---|---|
| 236,940 | 1/1881 | Faesch | 203—24 X |
| 1,379,502 | 5/1921 | Dewoern | 203—10 X |
| 2,756,029 | 7/1956 | Brogdon | 203—10 X |
| 3,043,763 | 7/1962 | Spillman | 176—60 X |
| 3,210,260 | 10/1965 | Denker et al. | 203—49 X |
| 3,213,001 | 10/1965 | Schmidt | 60—59 |
| 3,224,199 | 12/1965 | Best | 60—59 |

FOREIGN PATENTS

| | | |
|---|---|---|
| 193,665 | 12/1957 | Austria. |
| 866,939 | 5/1961 | Great Britain. |

NORMAN YUDKOFF, *Primary Examiner.*